United States Patent

Nagai et al.

[11] Patent Number: 5,993,524
[45] Date of Patent: Nov. 30, 1999

[54] IMAGE RECORDING METHOD, IMAGE RECORDING APPARATUS AND IMAGE RECORDING ACCELERATION LIQUID

[75] Inventors: Kiyofumi Nagai; Akio Kojima, both of Tokyo; Masato Igarashi, Kanagawa; Akiko Bannai; Hiroyuki Mochizuki, both of Tokyo; Takanori Tsuyuki, Shizuoka; Ikuko Tanaka, Tokyo; Masayuki Koyano, Kanagawa, all of Japan

[73] Assignee: Ricoh Company, Ltd., Tokyo, Japan

[21] Appl. No.: 09/148,511

[22] Filed: Sep. 4, 1998

[30] Foreign Application Priority Data

Sep. 4, 1997 [JP] Japan .................................. 9-256080

[51] Int. Cl.$^6$ .................................................. C09D 11/00
[52] U.S. Cl. ..................... 106/31.27; 106/31.36; 106/31.58; 106/31.6; 106/31.68; 106/31.86
[58] Field of Search .............................. 106/31.27, 31.36, 106/31.58, 31.6, 31.68, 31.86

[56] References Cited

U.S. PATENT DOCUMENTS

| | | | |
|---|---|---|---|
| 5,549,740 | 8/1996 | Takahashi et al. | 106/31.43 |
| 5,624,484 | 4/1997 | Takahashi et al. | 106/31.75 |
| 5,835,116 | 11/1998 | Sato et al. | 106/31.43 |

*Primary Examiner*—Mark L. Bell
*Assistant Examiner*—Veronica F. Faison
*Attorney, Agent, or Firm*—Oblon, Spivak, McClelland, Maier & Neustadt, P.C.

[57] ABSTRACT

An image recording method for forming an image on a recording material, using a recording liquid which contains a coloring agent and a solvent in which the coloring agent is dispersed or dissolved, includes the steps of applying to a recording material a colorless or light colored image recording acceleration liquid containing a surfactant and a viscosity-increasing compound capable of increasing the viscosity of the recording liquid, and depositing the recording liquid imagewise on the recording material by ejecting the recording liquid in the form of droplets onto the recording material, and an image recording apparatus for carrying out the above image recording method is provided.

21 Claims, 1 Drawing Sheet

PRINTING PATTERN 1

PRINTING PATTERN 2

IMAGE RECORDING METHOD, IMAGE RECORDING APPARATUS AND IMAGE RECORDING ACCELERATION LIQUID

BACKGROUND OF THE INVENTION

1. Field of the Invention

The present invention relates to an image recording method and an image recording apparatus, more particularly to an ink jet image recording method and an image recording apparatus therefor. The present invention also relates to an image recording acceleration liquid for use in the image recording method and the image recording apparatus.

2. Discussion of Background

Ink-jet printers have been widely utilized in recent years because of the advantages of low noise and low running cost, and color printers capable of producing color images on a sheet of plain paper have also been placed on the market.

Conventionally, as coloring agents for use in inks for office-use ink-jet printers, dyes having high solubility are mainly used in order to avoid a problem of clogging of the nozzles of the ink-jet printers with the inks. Recently, however, pigment-containing inks are also increasingly used to prepare posters which are required to be water-resistant and light-resistant. The pigment-containing inks, however, tend to cause the above-mentioned clogging problem, so that it is extremely difficult to maintain the printing reliability of the inks. Furthermore, when high color reproduction performance is required, for instance, as in photographic images and CG (computer graphics), sufficient coloring of cyan and magenta cannot be performed by the pigment-containing inks and accordingly clear images cannot be obtained by the pigment-containing inks.

When a color image is printed on a plain paper using an ink-jet printer, in order to minimize the spreading of inks in a color boundary portion such as a portion where two colors are superimposed, a surfactant is added to the inks to improve the ink penetration performance as disclosed in Japanese Laid-Open Patent Application 55-65269. In such a case, feathering takes place in characters or fine lines, so that there is devised such a system that an ink with low ink penetration performance is used only when characters are printed in black. However, the control of the spreading of the inks in the color boundaries and the prevention of the occurring of the feathering in characters and fine lines are both still insufficient for use in practice.

In order to solve such problems as mentioned above, a recording material such as plain paper coated in advance with a material for fixing a dye contained in an ink when images are formed on the surface of the recording material with the ink, or a recording material coated with a white pigment or a water-soluble polymer are disclosed, for instance, in Japanese Laid-Open Patent Applications 56-86789, 55-144172, 55-81992, 52-53012 and 56-89594.

Furthermore, in Japanese Laid-Open Patent Application 56-89595, there is proposed an ink-jet recording method in which a solution of a polymer such as carboxylmethyl cellulose, polyvinyl alcohol, or polyvinyl acetate is sprayed onto a recording material in advance, and images are thereafter printed by ejecting an ink onto a polymer-solution-sprayed portion of the recording material. In this ink-jet printing method, the sharpness of the printed image can be improved, but the dryness of the printed image cannot be improved. The result is that the image quality of a color image obtained by this ink-jet printing method cannot be improved so much.

For instance, in Japanese Laid-open Patent Applications 64-63185, 8-20159 and 8-20161, there is proposed an ink-jet recording method in which an image recording acceleration liquid which contains a compound capable of making insoluble a dye contained in an ink is deposited on the surface of a recording material by an ink-jet method, and then printing is performed by spraying an ink to a portion of the recording material where the image recording acceleration liquid is deposited. In this method, the amount of water deposited on a two-color superimposed portion on the recording material is so large that the spreading of the ink in the color boundaries cannot be sufficiently controlled and it may occur that the ink penetrates the recording material and reaches the back side of the recording material (this phenomenon is hereinafter referred to as "strike through"). Furthermore, this met hod has the problem that the recording material tends to curl or cockle.

SUMMARY OF THE INVENTION

Accordingly, it is therefore a first object of the present invention to provide an image recording method free of the above-mentioned conventional problems, capable of recording images, in particular, fine line images, with high reproduction performance, excellent water resistance, and high image quality free of ink spreading in color boundaries.

A second object of the present invention is to provide an image recording method capable of recording the above-mentioned images at high speed by improving image fixing speed.

A third object of the present invention is to provide an image recording method capable of recording the above-mentioned images with high image density, free of "strike through", with the occurrence of "curling" and "cockling" of the recording material being minimized.

A fourth object of the present invention is to provide an image recording apparatus capable of performing any of the above-mentioned image recording methods.

A fifth object of the present invention is to provide an image recording acceleration liquid for use in the above-mentioned image recording methods and image recording apparatus.

A sixth object of the present invention is to provide a recording liquid for use in the above-mentioned image recording methods and image recording apparatus.

The first, second, and third objects of the present invention can be achieved by an image recording method for forming an image on a recording material, using a recording liquid which comprises a coloring agent and a solvent in which the coloring agent is dispersed or dissolved, comprising the steps of (a) applying to the recording material a colorless or light colored image recording acceleration liquid capable of controlling a penetration performance of the recording liquid into the recording material and a fixing performance of the recording liquid onto the recording material, the image recording acceleration liquid comprising a surfactant and a viscosity-increasing compound capable of increasing the viscosity of the recording liquid, and (b) depositing the recording liquid imagewise on the recording material by ejecting the recording liquid in the form of droplets onto the recording material.

In the above-mentioned image recording method, it is preferable that the viscosity-increasing compound comprise an inorganic ion which can be liberated therefrom in the image recording acceleration liquid, and that the recording liquid further comprise a viscosity-increasing assisting compound capable of increasing the viscosity of the recording liquid in combination with the inorganic ion liberated from the viscosity-increasing compound.

Further, the viscosity-increasing assisting compound comprising hydroxyl group, for example, polyvinyl alcohol, derivatives thereof, or polysaccharide is preferably employed in the recording liquid.

It is preferable that the viscosity-increasing assisting compound for use in the recording liquid be in an amount of 0.1 to 5 wt. % of the total weight of the recording liquid.

In addition, preferable example of the above-mentioned inorganic ion that can be liberated from the viscosity-increasing compound is boric acid ion, and in this case, the viscosity-increasing compound may be selected from the group consisting of borax, ammonium borate and lithium borate.

It is preferable that the viscosity-increasing compound be in a range of 0.1 to 5 wt. % of the total weight of the image recording acceleration liquid.

In the image recording method, it is desirable that the image recording acceleration liquid be applied in a deposition amount of 0.1 g/m² to 10 g/m² to the recording material.

Furthermore, in the above image recording method, it is preferable that the surfactant for use in the image recording acceleration liquid comprise at least one compound selected from the group consisting of the following compounds:

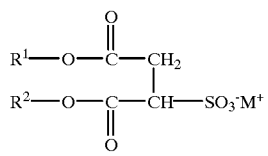

(1)

wherein $R^1$ and $R^2$ are each independently an alkyl group having at least 3 carbon atoms, which may be branched; and $M^+$ is a cation selected from the group consisting of an alkali metal cation, ammonium cation, an alkanolamine cation, a quaternary ammonium cation and a quaternary phosphonium cation,

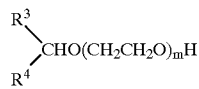

(2)

wherein $R^3$ and $R^4$ are each independently an alkyl group having 5 to 7 carbon atoms, and m is an integer of 5 to 20,

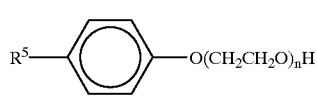

(3)

wherein $R^5$ is a carbon chain having 6 to 14 carbon atoms, which may be branched, and n is an integer of 5 to 20,

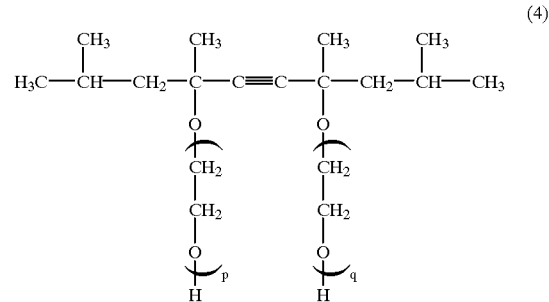

(4)

wherein p and q are each independently an integer of 0 to 20, and

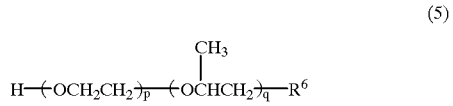

(5)

wherein $R^6$ is a carbon chain having 6 to 14 carbon atoms, which may be branched, and p and q are each independently an integer of 0 to 20.

Further, in the above image recording method, the image recording acceleration liquid may further comprise a monohydric alcohol.

The fourth object of the present invention can be achieved by an image recording apparatus for forming an image on a recording material, using a recording liquid which comprises a coloring agent and a solvent in which the coloring agent is dispersed or dissolved, comprising (a) means for applying to the recording material a colorless or light colored image recording acceleration liquid capable of controlling a penetration performance of the recording liquid into the recording material and a fixing performance of the recording liquid onto the recording material, the image recording acceleration liquid comprising a surfactant and a viscosity-increasing compound capable of increasing the viscosity of the recording liquid, and (b) means for depositing the recording liquid imagewise on the recording material by ejecting the recording liquid in the form of droplets onto the recording material.

The fifth object of the present invention can be achieved by an image recording acceleration liquid which is applied to a recording material before a recording liquid comprising a coloring agent and a solvent capable of dispersing or dissolving the coloring agent is ejected in the form of droplets onto the recording material for image formation, the image recording acceleration liquid comprising a surfactant, a viscosity-increasing compound capable of increasing the viscosity of the recording liquid, and a solvent capable of dispersing or dissolving the surfactant and the viscosity-increasing compound.

The sixth object of the present invention can be achieved by a recording liquid for forming an image on a recording material in such a manner that an image recording acceleration liquid comprising a surfactant and a viscosity-increasing compound capable of increasing the viscosity of the recording liquid, from which compound an inorganic ion can be liberated in the image recording acceleration liquid is applied to the recording material, and the recording liquid is deposited imagewise on the recording material by ejecting the recording liquid in the form of droplets onto the recording material, the recording liquid comprising a coloring agent, a viscosity-increasing assisting compound comprising hydroxyl group, capable of increasing the viscosity of the recording liquid in combination with the inorganic ion liberated from the viscosity-increasing compound, and a solvent for dispersing or dissolving the coloring agent and the viscosity-increasing assisting compound.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
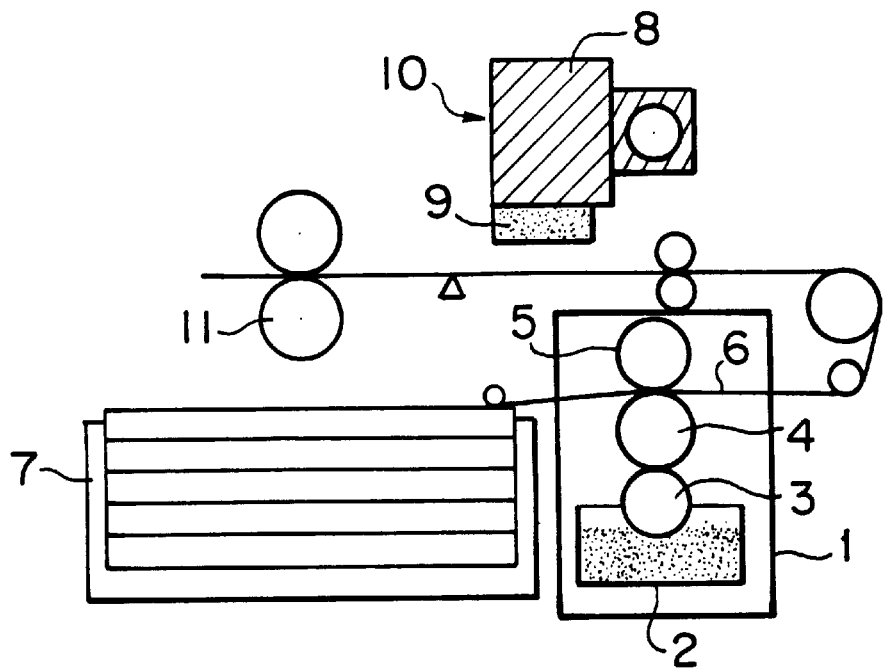
FIG. 1 is a schematic cross-sectional view of an example of the image recording apparatus of the present invention.

According to the image recording method of the present invention, the image recording acceleration liquid which contains a surfactant and a viscosity-increasing compound capable of thickening the recording liquid is applied to the recording material, and then the recording liquid is ejected in the form of droplets onto the recording material for image formation. By this recording method, the penetrability of the recording liquid into the recording material such as plain paper can be significantly improved, with the coloring agent being fixed on the surface of the recording material. Therefore, there can be obtained high quality images with excellent reproduction of fine lines, free of feathering and ink spreading in color boundaries, with high image density and high water resistance.

It is considered that this is because when the recording liquid is deposited on the recording material such as plain paper after the application of the above-mentioned image recording acceleration liquid, irregular wetting of the surface of the recording material with the recording liquid, which is caused by the distribution of a surface sizing agent in the surface portion of the recording material, can be minimized. As a result, the recording liquid can uniformly penetrate into the recording material, and at the same time, the recording liquid can stay near the surface of the recording material because the viscosity of the recording liquid can be abruptly increased.

The above-mentioned advantage of the present invention can be confirmed by the Bristow's method for determining the liquid dynamic absorbability of paper and board. As compared with the case where image formation is carried out merely by ejecting the recording liquid with a high penetrability in the form of droplets onto the recording material, the lag between the application of the recording liquid to the recording material and the wetting of the recording material by the recording liquid can be remarkably curtailed when the recording material which has been in advance coated with the above-mentioned image recording acceleration liquid is subjected to image formation. Thus, the reproduction of fine line images can be further improved.

Furthermore, according to the present invention, because of the improved penetrability of the recording liquid into the recording material and the rapid thickening of the recording liquid, high speed recording can be performed.

In the image recording acceleration liquid of the present invention, it is preferable that the viscosity-increasing compound capable of increasing the viscosity of the recording liquid comprise an inorganic ion, in particular, boric acid ion, that can be liberated from the viscosity-increasing compound in the image recording acceleration liquid. In such a case, borax, ammonium borate or lithium borate may be dissolved as the viscosity-increasing compound in a solvent to prepare the image recording acceleration liquid.

It is preferable that the amount of borax, ammonium borate or lithium borate be in the range of 0.1 to 5 wt. % of the total weight of the image recording acceleration liquid.

According to the present invention, it is preferable that the recording liquid further comprise a viscosity-increasing assisting compound capable of increasing the viscosity of the recording liquid in combination with the viscosity-increasing compound contained in the image recording acceleration liquid. When the viscosity-increasing compound for use in the image recording acceleration liquid comprises an inorganic ion, it is preferable that the viscosity-increasing assisting compound for use in the recording liquid comprise hydroxyl group.

Examples of the viscosity-increasing assisting compound having hydroxyl group for use in the recording liquid include polyvinyl alcohol and derivatives thereof, and polysaccharide such as locust bean gum, guar gum, carrageenan and gelan gum.

The amount of viscosity-increasing assisting compound having hydroxyl group, which varies depending on the kind of compound and the molecular weight thereof, is preferably in the range of 0.1 to 5 wt. % of the total weight of the recording liquid.

The viscosity-increasing assisting compound having hydroxyl group contained in the recording liquid forms a crosslinking structure together with the inorganic ion, preferably a boric acid ion, for use in the image recording acceleration liquid, whereby the viscosity of the recording liquid is abruptly increased. When the amount of viscosity-increasing assisting compound having hydroxyl group is in the range of 0.1 to 5 wt. % in the recording liquid, as mentioned above, the effect of thickening the recording liquid is sufficiently obtained without the clogging of the nozzles of the ink-jet printer with the recording liquid.

It is desirable that when equal amounts of recording liquid and image recording acceleration liquid are mixed together, the viscosity of the recording liquid increase to 5 times or more that of the recording liquid before mixed with the image recording acceleration liquid. To be more specific in practice, the increase in viscosity of the recording liquid may be controlled to 5 times or more by selecting the kind of viscosity-increasing compound comprising an inorganic ion and adjusting the concentration of the inorganic ion in the image recording acceleration liquid, and in addition, by selecting the kind of viscosity-increasing assisting compound having hydroxyl group and adjusting the content of such a compound in the recording liquid.

When the image recording acceleration liquid and the recording liquid are prepared so as to thicken the recording liquid to such a degree as mentioned above, the reproduction performance of fine lines can be further improved, and ink spreading in color boundaries can be minimized.

Depending on the kind of recording material, the penetrating performance of the recording liquid into the recording material may not be sufficiently controlled when the increase in viscosity of the recording liquid is less than 5 times. In order to obtain sufficient reproduction performance of fine lines and prevent the ink spreading in color boundaries, it is desirable that the recording liquid be ejected onto the recording material for image recording within 10 seconds after the application thereto of the image recording acceleration liquid, and that the viscosity of the recording liquid be increased 5 times or more.

The advantages of the image recording method of the present invention can be obtained when there is employed a pigment-containing recording liquid with the penetrability, by which the density of the obtained image is conventionally considered to be low. To be more specific, by use of the recording liquid comprising a pigment and a water-soluble polymer having hydroxyl group and the image recording acceleration liquid comprising an inorganic ion such as boric acid ion, the boric acid ion in the image recording acceleration liquid is allowed to react with the compound having hydroxyl group when the recording liquid is applied to the recording material coated with the image recording acceleration liquid, thereby forming a crosslinking structure. Accordingly, it is considered that the thickening of the recording liquid will take place speedily.

The image recording acceleration liquid of the present invention comprises a surfactant. Therefore, the contact angle of the recording liquid to be deposited on the recording material to which the image recording acceleration liquid has been applied can be adjusted so as to be 90° or less. Thus, the wettability of the surface of the recording material with the recording liquid can be improved and the penetration rate of the recording liquid into the recording material can be increased, so that images with high image quality and high image density can be obtained and high speed recording can be achieved.

It is preferable that the amount of surfactant be in the range of 0.5 to 80 wt. % of the total weight of the image recording acceleration liquid.

It is preferable that the surfactant for use in the image recording acceleration liquid comprise at least one compound selected from the group consisting of the following compounds:

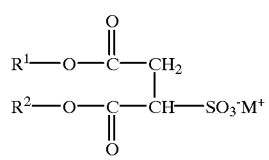

(1)

wherein $R^1$ and $R^2$ are each independently an alkyl group having at least 3 carbon atoms, which may be branched; and $M^+$ is a cation selected from the group consisting of an alkali metal cation, ammonium cation, an alkanolamine cation, a quaternary ammonium cation and a quaternary phosphonium cation,

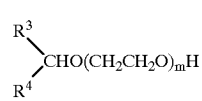

(2)

wherein $R^3$ and $R^4$ are each independently an alkyl group having 5 to 7 carbon atoms, and m is an integer of 5 to 20,

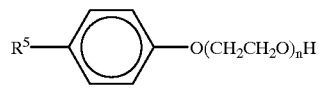

(3)

wherein $R^5$ is a carbon chain having 6 to 14 carbon atoms, which may be branched, and n is an integer of 5 to 20,

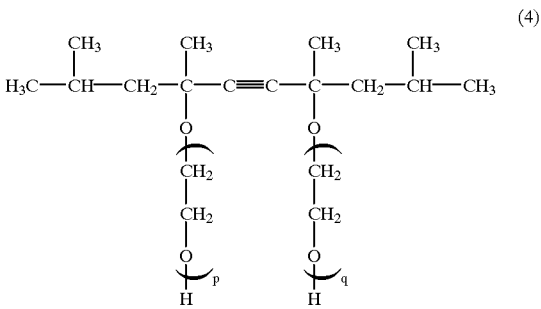

(4)

wherein p and q are each independently an integer of 0 to 20, and

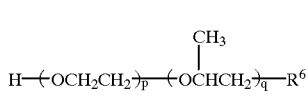

(5)

wherein $R^6$ is a carbon chain having 6 to 14 carbon atoms, which may be branched, and p and q are each independently an integer of 0 to 20.

Of the above surfactants of formulas (1) to (5), a dialkylsulfosuccinate of formula (1) is preferable, and a dialkylsulfosuccinate of formula (1) in which $R^1$ and $R^2$ are each independently a branched alkyl group having 5 to 7 carbon atoms is more preferable.

Specific examples of the dialkylsulfosuccinate represented by formula (1) are shown below in the respective free acid forms:

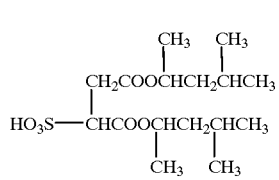

(1-1)

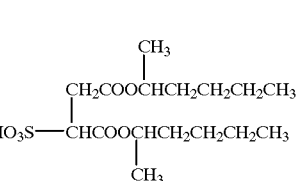

(1-2)

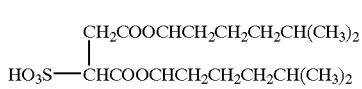

(1-3)

(1-4)

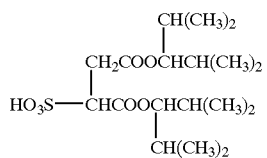

(1-5)

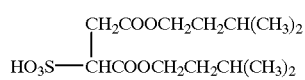

When the dialkylsulfosuccinate represented by formula (1) is used as the surfactant, preferable counter ions therefor to be used are lithium cation, sodium cation, cations represented by formula (6) such as an alkanolamine cation, a quaternary ammonium cation, and a quaternary phosphonium. Since when such a counter ion is used, the solubility stability of the image recording acceleration liquid can be significantly improved.

(6)

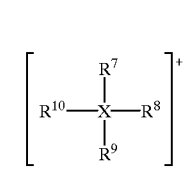

wherein X is nitrogen or phosphorus, and $R^7$, $R^8$, $R^9$ and $R^{10}$ are each independently a hydrogen atom, an alkyl group having 1 to 4 carbon atoms, a hydroxyalkyl group or a halogenated alkyl group.

For instance, when as the dialkylsulfosuccinate represented by formula (1), lithium dialkylsulfosuccinate or sodium dialkylsulfosuccinate is used, lithium dialkylsulfosuccinate and sodium dialkylsulfosuccinate can be respectively obtained by adding lithium hydroxide and sodium hydroxide to dialkylsulfosuccinic acid. When as the dialkylsulfosuccinate represented by formula (1), an alkanolamine dialkylsulfosuccinate, a quaternary ammonium dialkylsulfosuccinate, and a quaternary phosphonium dialkylsulfosuccinate are used, an alkanolamine dialkylsulfosuccinate, a quaternary ammonium dialkylsulfosuccinate, and a quaternary phosphonium dialkylsulfosuccinate can be obtained by adding hydroxides, for instance, hydroxides of formulas (6-1) to (6-9) as shown below to dialkylsulfosuccinic acid.

(6-1)

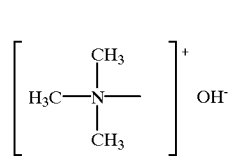

(6-2)

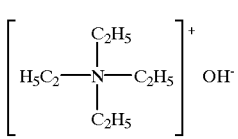

(6-3)

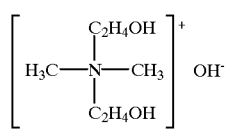

(6-4)

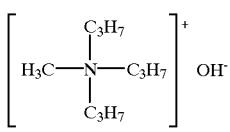

(6-5)

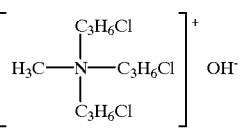

(6-6)

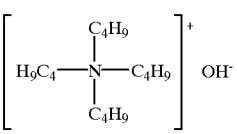

(6-7)

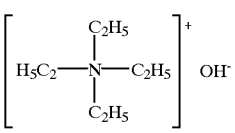

(6-8)

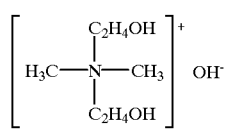

(6-9)

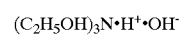

$(C_2H_5OH)_3N \cdot H^+ \cdot OH^-$

However, it is not always required that all of the counter ions of the dialkylsulfosuccinate represented by formula (1) for use in the present invention be a cation selected from the group consisting of lithium cation, sodium cation, and the cations represented by the above-mentioned formula (6). Other alkali ions may also be used.

It is preferable that the lithium cation, sodium cation, and cations represented by the above-mentioned formula (6) be in an amount of 30% or more, more preferably 50% or more, of the amount of the dialkylsulfosuccinic acid in terms of molar amount.

It is also preferable that the image recording acceleration liquid further comprise a monohydric alcohol. By the addition of a monohydric alcohol to the image recording acceleration liquid, bubbling and non-uniform coating of the image recording acceleration liquid can be effectively prevented. By applying such an image recording acceleration liquid to the recording material, and then depositing the recording liquid on the recording material, images with uniform density can be obtained.

The image recording acceleration liquid of the present invention may further comprise a compound which is capable of making the coloring agent contained in the recording liquid insoluble.

Examples of such a compound that is capable of making insoluble, for instance, an anionic coloring agent contained in the recording liquid are organic compounds having at least one cationic group, such as polyallyl amine and polyethyleneimine; water-soluble multivalent metallic compounds having at least one multivalent metallic ion, such as calcium chloride, calcium hydroxide, calcium nitrate, magnesium hydroxide, magnesium chloride, ammonium alum, and aluminum sulfate; and silica sol which is a dispersion of spherical silica particles with a particle size of about 0.1 μm.

By the addition of any of the above-mentioned compounds, anionic coloring agents such as anionic dyes can be made insoluble, so that recording images with excellent water resistance and high image density can be obtained.

It is preferable that the amount of the above-mentioned compound for making insoluble the coloring agent contained in the recording liquid be in the range of 0.1 to 10 wt. % of the total weight of the image recording acceleration liquid.

The image recording acceleration liquid comprises water as a main liquid medium. To impart the desired physical properties to the image recording acceleration liquid, to prevent the image recording acceleration liquid from drying, and to improve the solubility stability of the surfactant and the compound for making insoluble the coloring agent contained in the recording liquid, and also to stabilize the coating characteristics of the image recording acceleration liquid, the following water-soluble organic solvents can be employed for the preparation of the image recording acceleration liquid: polyhydric alcohols such as ethylene glycol, diethylene glycol, triethylene glycol, polyethylene glycol, polypropylene glycol, 1,5-pentanediol, 1,6-hexanediol, glycerol, 1,2,6-hexanetriol, 1,2,4-butanetriol, 1,2,3-butanetriol, and 3-methylpentane-1,3,5-triol; alkyl ethers derived from polyhydric alcohols such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidinone, and ε-caprolactam; amides such as formamide, N-methylformamide, and N,N-dimethylformamide; amines such as monoethanol amine, diethanol amine, triethanol amine, monoethylamine, diethyl amine, and triethyl amine; sulfur-containing compounds such as dimethyl sulfoxide, sulfolane, and thiodiethanol; propylene carbonate; ethylene carbonate; and γ-butyrolactone. These organic solvents can be employed alone or in combination when used together with water.

Of the above water-soluble organic solvents, diethylene glycol, thiodiethanol, polyethylene glycol (200) to (600), triethylene glycol, glycerol, 1,2,6-hexanetriol, 1,2,4-butanetriol, 3-methylpentane-1,3,5-triol, 1,5-pentanediol, N-methyl-2-pyrrolidone, N-hydroxyethylpyrrolidone, 2-pyrrolidone, and 1,3-dimethylimidazolidinone are particularly preferable for use in the present invention.

This is because by use of these water-soluble organic solvents, the solubilities of the surfactant and the viscosity-increasing compound for thickening the recording liquid in the solvents can be highly increased, and the impairment of the image recording acceleration liquid ejection characteristics, which is caused by the evaporation of a water component from the image recording acceleration liquid, can be effectively prevented.

In particular, pyrrolidone derivatives such as N-hydroxyethyl-2-pyrrolidone are suitable for stabilizing the dispersion stability of the dialkylsulfosuccinate represented by formula (1).

It is preferable that the image recording acceleration liquid be deposited in an amount of 0.1 $g/m^2$ to 10 $g/m^2$ in order to minimize the curling of the recording material.

The recording liquid which comprises a coloring agent and a solvent for dissolving or dispersing the coloring agent for use in the image recording method and the image recording apparatus according to the present invention will now be explained.

As the coloring agent for use in the recording liquid, water-resistant and light-resistant water-soluble dyes are preferable, which can be classified into acid dye, direct dye, basic dye, reactive dye and food dye in accordance with the color index numbers thereof.

Specific examples of the acid dye and the food dye are as follows:
C.I. Acid Yellow 17, 23, 42, 44, 79, 142;
C.I. Acid Red 1, 8, 13, 14, 18, 26, 27, 35, 37, 42, 52, 82, 87, 89, 92, 97, 106, 111, 114, 115, 134, 186, 249, 254, 289;
C.I. Acid Blue 9, 29, 45, 92, 249;
C.I. Acid Black 1, 2, 7, 24, 26, 94;
C.I. Food Yellow 3, 4;
C.I. Food Red 7, 9, 14; and
C.I. Food Black 1, 2.

Specific examples of direct dyes are as follows:
C.I. Direct Yellow 1, 12, 24, 26, 33, 44, 50, 86, 120, 132, 142, 144;
C.I. Direct Red 1, 4, 9, 13, 17, 20, 28, 31, 39, 80, 81, 83, 89, 225, 227;
C.I. Direct Orange 26, 29, 62, 102;
C.I. Direct Blue 1, 2, 6, 15, 22, 25, 71, 76, 79, 86, 87, 90, 98, 163, 165, 199, 202; and
C.I. Direct Black 19, 22, 32, 38, 51, 56, 71, 74, 75, 77, 154, 168, 171.

Specific examples of basic dyes are as follows:
C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91;
C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112;
C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and
C.I. Basic Black 2, 8.

Specific examples of reactive dyes are as follows:
C.I. Reactive Black 3, 4, 7, 11, 12, 17;
C.I. Reactive Yellow 1, 5, 11, 13, 14, 20, 21, 22, 25, 40, 47, 51, 55, 65, 67;
C.I. Reactive Red 1, 14, 17, 25, 26, 32, 37, 44, 46, 55, 60, 66, 74, 79, 96, 97; and
C.I. Reactive Blue 1, 2, 7, 14, 15, 23, 32, 35, 38, 41, 63, 80, 95.

Of these dyes, anionic acid dyes and direct dyes are preferably employed in the present invention. It is also preferable to use dyes which are developed for use in ink-jet printing. Examples of such dyes are Projet Fast Black 2, Projet Fast Cyan 2, Projet Fast Magenta 2, and Projet Fast Yellow 2 (made by Zeneca K. K.).

In the present invention, a pigment is usable as the coloring agent for use in the recording liquid.

Specific examples of the pigment for use in the recording liquid include organic pigments such as azo pigments, phthalocyanine pigments, anthraquinone pigments, dioxazine pigments, indigo pigments, thioindigo pigments, perylene pigments, isoindolenone pigments, Aniline Black, azomethine pigments, Rhodamine B lake pigments, and carbon black; and inorganic pigments such as iron oxide, titanium oxide, calcium carbonate, barium sulfate, aluminum hydroxide, barium yellow, Prussian blue, cadmium red, chrome yellow, and metal powder.

For the formation of color images, carbon black, which may be subjected to surface modification so as to become hydrophilic, is preferably employed for a black image; azo pigments such as C.I. Pigment Yellow 13, 17 and 174, for a yellow image; quinacridone pigments such as C.I. Pigment Red 122 and azo pigments such as C.I. Pigment Red 184, for a magenta image; and copper phthalocyanine and metal-free phthalocyanine, for a cyan image.

Those pigments may be used in the form of finely-divided particles with a particle diameter of 0.01 to 0.1 $\mu$m. When the particle size of the pigment is within the above-mentioned range, the decrease of image density can be prevented due to sufficient hiding power, and the light resistance of the image is equivalent to that of the image prepared by use of a dye. In addition, there is not a risk of a nozzle of the printer head or a filter for use in the ink-jet printer being clogged with the ink composition, and therefore, stable ink-ejecting performance can be obtained.

Furthermore, it is preferable to use a pigment with a HLB value of 11 to 20 as the coloring agent for the recording liquid. The HLB value of the pigment to be employed can be controlled by the hydrophilic treatment in such a manner that an acid treatment is carried out or low-temperature plasma treatment is performed in a stream of oxygen or nitrogen.

The recording liquid for use in the present invention may further comprise a pigment dispersant.

Examples of the pigment dispersant having a hydrophilic moiety and a hydrophobic moiety include the following hydrophilic polymers:

(1) natural polymers, for example, vegetable polymers such as gum arabic, tragacanth gum, guar gum, karaya gum, locust bean gum, arabinogalactan, pectin, and quince seed starch; seaweed polymers such as alginic acid, carrageenan, and agar; animal polymers such as gelatin, casein, albumin, and collagen; microbial polymers such as xanthene gum and dextran; and shellac;

(2) semisynthetic polymers, for example, fiber polymers such as methyl cellulose, ethyl cellulose, hydroxyethyl cellulose, hydroxypropyl cellulose, and carboxymethyl cellulose; starch polymers such as starch sodium glycolate and starch sodium phosphate; seaweed-based polymers such as sodium alginate and propyleneglycol alginate; and (3) synthetic polymers, for example, vinyl polymers such as polyvinyl alcohol, polyvinyl pyrrolidone, and polyvinyl methyl ether; acrylic resins such as noncrosslinked polyacrylamide, polyacrylic acid and metal salts thereof, and water-soluble styrene-acrylic resin; water-soluble styrene-maleic acid resin; water-soluble vinylnaphthalene-acrylic resin; water-soluble vinylnaphthalene-maleic acid resin; an alkaline metal salt of a condensation product of formalin and β-naphthalene-sulfonic acid; and polymeric compounds having as a side chain a salt of a cationic functional group such as quaternary ammonium or amino group.

The above-mentioned hydrophilic polymers can also serve to adjust the viscosity of the obtained recording liquid.

In particular, polyvinyl alcohol and derivatives thereof, and polysaccharide, for example, locust bean gum, guar gum, carrageenan and gelan gum can preferably serve in the recording liquid as the viscosity-increasing assisting compounds having hydroxyl group when the viscosity-increasing compound for use in the image recording acceleration liquid comprises an inorganic ion.

The recording liquid comprises water as a main liquid medium. To impart the desired physical properties to the recording liquid, to prevent the recording liquid from drying, and to improve the solubility stability of the coloring agent, the same water-soluble organic solvents as stated in the description of the image recording acceleration liquid can be employed for the preparation of the recording liquid.

In particular, diethylene glycol, thiodiethanol, polyethylene glycol (200) to (600), triethylene glycol, glycerol, 1,2, 6-hexanetriol, 1,2,4-butanetriol, 3-methylpentane-1,3,5-triol, 1,5-pentanediol, N-methyl-2-pyrrolidone, N-hydroxyethyl-2-pyrrolidone, 2-pyrrolidone, and 1,3-dimethylimidazolidinone are preferable for the preparation of the recording liquid. This is because by use of these water-soluble organic solvents, the solubility of the coloring agent can be highly increased, and the impairment of the recording liquid ejection characteristics, which is caused by the evaporation of a water component from the recording liquid, can be effectively prevented. Of the above water-soluble organic solvents, pyrrolidone derivatives such as N-hydroxyethyl-2-pyrrolidone are suitable.

Furthermore, the above-mentioned surfactants represented by formulas (1) to (5), and other surfactants may be added to the recording liquid, whereby the surface tension of the recording liquid can be adjusted so as to improve the penetrability of the recording liquid into the recording material, and also the wettability of a head member of an ink-jet printer with the recording liquid. The ejection stability of the recording liquid can be thus improved.

In order to adjust the surface tension of the recording liquid, the recording liquid may further comprise a penetrating agent other than the surfactants.

Specific examples of the penetrating agent for use in the recording liquid include alkyl ethers or aryl ethers derived from polyhydric alcohols such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, and tetraethylene glycol chlorophenyl ether; polyoxyethylene-polyoxypropylene block copolymer; fluorochemical surfactants; and lower alcohols such as ethanol and 2-propanol. Of the above penetrating agents, diethylene glycol monobutyl ether is particularly suitable for use in the present invention.

The image recording acceleration liquid and the recording liquid for use in the present invention may further comprise conventionally known additives such as an antiseptic agent, a mildewproofing agent, a pH adjustor, a chelate reagent, and a corrosion inhibitor.

For instance, sodium dehydroacetate, sodium sorbate, sodium 2-pyridinethiol-1-oxide, sodium benzoate, and sodium pentachlorophenol can be employed as the antiseptic agents and mildewproofing agents.

There can be employed as the pH adjustor any material that can adjust the pH values of the image recording acceleration liquid and the recording liquid to 7 or more without having any adverse effects thereon. Examples of the pH adjustor for use in the present invention are amines such as diethanolamine and triethanolamine; hydroxides of alkaline metals such as lithium hydroxide, sodium hydroxide and potassium hydroxide; other hydroxides such as ammonium hydroxide, quaternary ammonium hydroxide and quaternary phosphonium hydroxide; and carbonates of alkaline metals such as lithium carbonate, sodium carbonate, and potassium carbonate.

Examples of the chelate reagent for use in the image recording acceleration liquid and the recording liquid are sodium ethylene diamine tetraacetate, sodium nitrilotriacetate, sodium hydroxyethyl ethylene diamine triacetate, sodium diethylene triamine pentaacetate, and sodium uramil diacetate.

Examples of the corrosion inhibitor for use in the image recording acceleration liquid and the recording liquid are acid sulfite, sodium thiosulfate, ammon thiodiglycollic acid, diisopropyl ammonium nitrite, pentaerythritol tetranitrate, and dicyclohexyl ammonium nitrite.

Furthermore, the image recording acceleration liquid and the recording liquid may further comprise a water-soluble ultraviolet absorbing agent or a water-soluble infrared absorbing agent when necessary.

An image recording apparatus of the present invention will now be explained.

FIG. 1 is a schematic cross-sectional view of an example of the image recording apparatus of the present invention.

Reference numeral 1 indicates means for applying to a recording material a colorless or light colored image recording acceleration liquid for controlling the penetration performance and image fixing performance of a recording liquid which comprises a coloring agent and a solvent for dispersing or dissolving the coloring agent. The means 1 comprises a container 2 for holding the image recording acceleration liquid therein, a scoop-up roller 3 for scooping up the image recording acceleration liquid, an application roller 4 for applying the image recording acceleration liquid to a recording material 6, and a holding roller 5.

The recording material 6 is transported from a recording material storing cassette 7 into the above-mentioned means 1 for applying to the recording material 6 the image recording acceleration liquid, and the image recording acceleration liquid is applied to the recording material 6 by the application roller 4. It is preferable that the image recording acceleration liquid be applied in an amount of 0.1 g/m² to 10 g/m² to the recording material 6.

The recording material 6 to which the image recording acceleration liquid has been applied is then transported to means 10 where the recording liquid is deposited imagewise on the recording material 6. The means 10 includes a carriage 8 and a printing head 9, and the recording liquid is ejected in the form of droplets onto the recording material 6 from the printing head 9.

The printing head 9 used in this image recording apparatus has 128 nozzles with a nozzle diameter of 30 μm, using a layered PZT, and is capable of ejecting the recording liquid therefrom, so that images can be formed on the recording material with a picture element density of 600 dpi with a droplet weight of 15 ng. The image-printed recording material 6 is then transported onto a discharge roller 11. The method of ejecting the recording liquid from the printing head 9 and the resolution of the printing head 9 are not necessarily limited to the above-mentioned ejection method and the resolution. A printing head capable of ejecting the recording liquid, using thermal energy, can also be employed.

Other features of this invention will become apparent in the course of the following description of exemplary embodiments, which are given for illustration of the invention and are not intended to be limiting thereof.

EXAMPLE 1

[Preparation of Yellow Recording Liquid No. 1, Magenta Recording Liquid No. 1, Cyan Recording Liquid No. 1, and Black Recording Liquid No. 1]

A yellow recording liquid No. 1, a magenta recording liquid No. 1, a cyan recording liquid No. 1, and a black recording liquid No. 1 were separately prepared by dissolving each mixture with the formulation shown below, and filtering each mixture through a 0.22 μm meshed Teflon filter:

[Formulation of Yellow Recording Liquid No. 1]

|  | Wt. % |
| --- | --- |
| C.I. Acid Yellow 23 | 1 |
| Projet Fast Yellow 2 | 1 |
| (made by Zeneca K. K.) |  |
| Glycerol | 5 |
| N-hydroxyethyl pyrrolidone | 5 |
| Surfactant of formula (4) | 0.1 |
| (p, q = 10) |  |
| Polyvinyl alcohol | 1 |
| (molecular weight: 500) |  |
| Sodium 2-pyridinethiol-1-oxide | 0.2 |
| Ion exchange water | Balance |

[Formulation of Magenta Recording Liquid No. 1]

|  | Wt. % |
| --- | --- |
| C.I. Acid Red 52 | 1 |
| Projet Fast Magenta 2 | 1 |
| (made by Zeneca K. K.) |  |
| Glycerol | 5 |
| N-hydroxyethyl pyrrolidone | 5 |
| Surfactant of formula (4) | 0.1 |
| (p, q = 10) |  |
| Polyvinyl alcohol | 1 |
| (molecular weight: 500) |  |
| Sodium 2-pyridinethiol-1-oxide | 0.2 |
| Ion exchange water | Balance |

[Formulation of Cyan Recording Liquid No. 1]

|  | Wt. % |
| --- | --- |
| C.I. Acid Blue 9 | 1 |
| Projet Fast Cyan 2 | 1 |
| (made by Zeneca K. K.) |  |
| Glycerol | 5 |
| N-hydroxyethyl pyrrolidone | 5 |
| Surfactant of formula (4) | 0.1 |
| (p, q = 10) |  |
| Polyvinyl alcohol | 1 |
| (molecular weight: 500) |  |
| Sodium 2-pyridinethiol-1-oxide | 0.2 |
| Ion exchange water | Balance |

[Formulation of Black Recording Liquid No. 1]

|  | Wt. % |
| --- | --- |
| C.I. Direct Black 168 | 3 |
| Glycerol | 5 |
| 2-pyrrolidone | 5 |
| Surfactant of formula (4) | 0.1 |
| (p, q = 10) |  |
| Polyvinyl alcohol | 1 |
| (molecular weight: 500) |  |
| Sodium 2-pyridinethiol-1-oxide | 0.2 |
| Ion exchange water | Balance |

[Preparation of Image Recording Acceleration Liquid No. 1]

A mixture of the following components with the following formulation was stirred, whereby an image recording acceleration liquid No. 1 was prepared:

|  | Wt. % |
| --- | --- |
| Polyallyl amine | 3 |
| Surfactant of formula (1-1) | 20 |
| Borax | 1 |
| 2-propanol | 5 |
| Propylene glycol | 10 |
| 25% aqueous solution of Compound of formula (6-1) | 1 |
| Ion exchange water | Balance |

Figure 2:
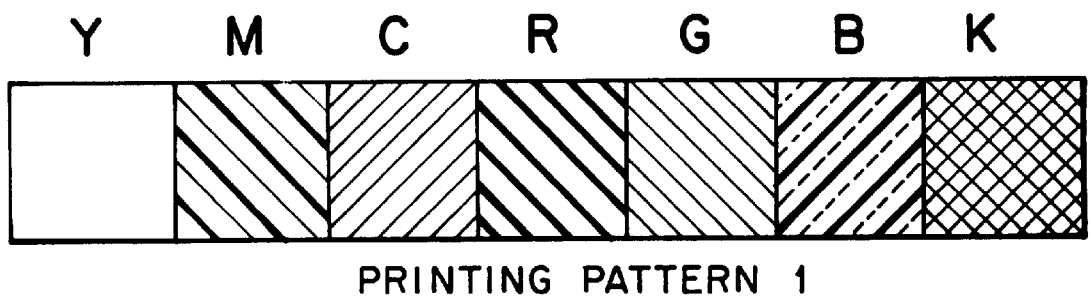
FIG. 2 is a printing test original composed of a printing pattern 1 and a printing pattern 2 for checking image quality produced.
Figure 2:
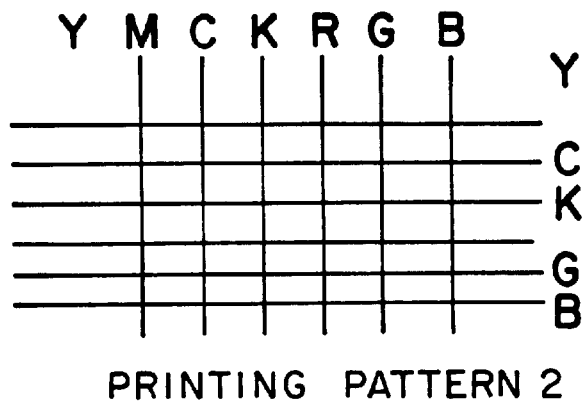

The above prepared image recording acceleration liquid No. 1 was placed in the container 2 of the above-mentioned image recording apparatus shown in FIG. 1, and the image recording acceleration liquid No. 1 was applied to a commercially available copy paper and also to a commercially available bond paper. Using a printing pattern 1 and a printing pattern 2 as shown in FIG. 2, solid images and fine line images were then formed on the copy paper and the bond paper by use of the image recording apparatus supplied with the above prepared yellow recording liquid No. 1, magenta recording liquid No. 1, cyan recording liquid No. 1 and black recording liquid No. 1. Each recording liquid was ejected from the printing head 9 having 128 nozzles with a nozzle diameter of 30 μm, using a layered PZT, with a picture element density of 600 dpi with a droplet weight of 18 ng.

The result was that the images reproduced were excellent in fine line reproduction performance, and free of spreading of the recording liquids in color boundaries.

In the printing pattern 1 shown in FIG. 2, Y, M, C, R, G, B and K respectively represent a yellow solid image, a magenta solid image, a cyan solid image, a red solid image, a green solid image, a blue solid image, and a black solid image. In the printing pattern 2 shown in FIG. 2, fine lines with the above-mentioned colors of Y, M, C, R, G, B and K are crossed.

Furthermore, copy samples, each having a solid image in an entire printing possible area thereof, were made. There was observed almost no curling in the thus prepared copy samples.

EXAMPLE 2

[Preparation of Yellow Recording Liquid No. 2, Magenta Recording Liquid No. 2, Cyan Recording Liquid No. 2, and Black Recording Liquid No. 2]

A yellow recording liquid No. 2, a magenta recording liquid No. 2, a cyan recording liquid No. 2, and a black recording liquid No. 2 were separately prepared by dissolving each mixture with the formulation shown below, and filtering each mixture through a 0.22 μm meshed Teflon filter:

[Formulation of Yellow Recording Liquid No. 2]

|  | Wt. % |
| --- | --- |
| C.I. Acid Yellow 23 | 1 |
| C.I. Direct Yellow 142 | 1 |
| Glycerol | 5 |
| N-hydroxyethyl pyrrolidone | 5 |
| Surfactant of formula (3) ($R^5 = C_9H_{19}$, n = 12) | 0.1 |
| Carrageenan | 0.5 |
| Sodium 2-pyridinethiol-1-oxide | 0.2 |
| Ion exchange water | Balance |

[Formulation of Magenta Recording Liquid No. 2]

|  | Wt. % |
| --- | --- |
| C.I. Acid Red 254 | 2 |
| Glycerol | 5 |
| N-hydroxyethyl pyrrolidone | 5 |
| Surfactant of formula (3) ($R^5 = C_9H_{19}$, n = 12) | 0.1 |
| Carrageenan | 0.5 |
| Sodium 2-pyridinethiol-1-oxide | 0.2 |
| Ion exchange water | Balance |

[Formulation of Cyan Recording Liquid No. 2]

|  | Wt. % |
| --- | --- |
| C.I. Acid Blue 249 | 2 |
| C.I. Direct Blue 199 | 1 |
| Glycerol | 5 |
| N-hydroxyethyl pyrrolidone | 5 |
| Surfactant of formula (3) ($R^5 = C_9H_{19}$, n = 12) | 0.1 |
| Carrageenan | 0.5 |
| Sodium 2-pyridinethiol-1-oxide | 0.2 |
| Ion exchange water | Balance |

[Formulation of Black Recording Liquid No. 2]

|  | Wt. % |
| --- | --- |
| Projet Fast Black 2 | 3 |
| C.I. Acid Yellow 23 | 0.2 |
| Glycerol | 5 |
| 2-pyrrolidone | 5 |
| Surfactant of formula (3) ($R^5 = C_9H_{19}$, n = 12) | 0.1 |
| Carrageenan | 0.5 |
| Sodium 2-pyridinethiol-1-oxide | 0.2 |
| Ion exchange water | Balance |

[Preparation of Image Recording Acceleration Liquid No. 2]

A mixture of the following components with the following formulation was stirred, whereby an image recording acceleration liquid No. 2 was prepared:

|  | Wt. % |
| --- | --- |
| Myristyldimethyl benzalkonium chloride | 3 |
| Surfactant of formula (2) ($R^3$, $R^4 = C_6H_{13}$, n = 7) | 20 |
| Lithium borate | 5 |
| 2-propanol | 5 |
| Propylene glycol | 10 |
| Ion exchange water | Balance |

Printing tests were conducted in the same manner as in Example 1 except that the yellow recording liquid No. 1, magenta recording liquid No. 1, cyan recording liquid No. 1 and black recording liquid No. 1 employed in Example 1 were respectively replaced with the above prepared yellow recording liquid No. 2, magenta recording liquid No. 2, cyan recording liquid No. 2 and black recording liquid No. 2. The result was that the images reproduced were excellent in fine line reproduction performance, and free of spreading of the recording liquids in color boundaries. Furthermore, copy samples, each having a solid image in an entire printing possible area thereof, were made. There was observed almost no curling in the thus prepared copy samples.

EXAMPLE 3

[Preparation of Yellow Recording Liquid No. 3, Magenta Recording Liquid No. 3, Cyan Recording Liquid No. 3, and Black Recording Liquid No. 3]

A yellow recording liquid No. 3, a magenta recording liquid No. 3, a cyan recording liquid No. 3, and a black recording liquid No. 3 were separately prepared by dissolving each mixture with the formulation shown below, and filtering each mixture through a 0.45 μm meshed Teflon filter.

The pigments for use in the magenta recording liquid No. 3, the cyan recording liquid No. 3 and the black recording liquid No. 3 were separately used in the form of a dispersion with a concentration of 5% prepared by the application of ultrasonic wave.

[Formulation of Yellow Recording Liquid No. 3]

|  | Wt. % |
|---|---|
| Projet Fast Yellow 2 | 1 |
| C.I. Direct Yellow 142 | 0.5 |
| Glycerol | 5 |
| N-hydroxyethyl pyrrolidone | 5 |
| Surfactant of formula (5) ($R^6 = C_3H_7$, p, q = 20) | 0.1 |
| Guar gum | 0.2 |
| Sodium 2-pyridinethiol-1-oxide | 0.2 |
| Ion exchange water | Balance |

[Formulation of Magenta Recording Liquid No. 3]

|  | Wt. % |
|---|---|
| C.I. Pigment Red 122 | 2 |
| C.I. Acid Red 52 | 1 |
| Glycerol | 5 |
| N-hydroxyethyl pyrrolidone | 5 |
| Styrene acrylic acid - hydroxyethyl acrylate copolymer | 0.1 |
| Surfactant of formula (5) ($R^6 = C_3H_7$, p, q = 20) | 0.1 |
| Guar gum | 0.2 |
| Sodium 2-pyridinethiol-1-oxide | 0.2 |
| Ion exchange water | Balance |

[Formulation of Cyan Recording Liquid No. 3]

|  | Wt. % |
|---|---|
| C.I. Pigment Blue 15 | 2 |
| C.I. Reactive Blue 7 | 1 |
| Glycerol | 5 |
| N-hydroxyethyl pyrrolidone | 5 |
| Styrene acrylic acid - hydroxyethyl acrylate copolymer | 0.1 |
| Surfactant of formula (5) ($R^6 = C_3H_7$, p, q = 20) | 0.1 |
| Sodium 2-pyridinethiol-1-oxide | 0.2 |
| Guar gum | 0.2 |
| Ion exchange water | Balance |

[Formulation of Black Recording Liquid 3]

|  | Wt. % |
|---|---|
| Carbon Black | 2 |
| C.I. Direct Black 154 | 1 |
| Glycerol | 5 |
| 2-pyrrolidone | 5 |
| Styrene acrylic acid hydroxyethyl acrylate copolymer | 0.1 |
| Surfactant of formula (5) ($R^6 = C_3H_7$, p, q = 20) | 0.1 |
| Guar guin | 0.2 |
| Sodium 2-pyridinethiol-1-oxide | 0.2 |
| Ion exchange water | Balance |

[Preparation of Image Recording Acceleration Liquid No. 3]

A mixture of the following components with the following formulation was stirred, whereby an image recording acceleration liquid No. 3 was prepared:

|  | Wt. % |
|---|---|
| Silica sol dispersion (Solid content: 5%) | 40 |
| Surfactant of formula (3) ($R^5 = C_9H_{19}$, n = 12) | 0.1 |
| Ammonium borate | 5 |
| 2-propanol | 5 |
| Propylene glycol | 10 |
| Ion exchange water | Balance |

Printing tests were conducted in the same manner as in Example 1 except that the yellow recording liquid No. 1, magenta recording liquid No. 1, cyan recording liquid No. 1 and black recording liquid No. 1 employed in Example 1 were respectively replaced with the above prepared yellow recording liquid No. 3, magenta recording liquid No. 3, cyan recording liquid No. 3 and black recording liquid No. 3. The result was that the images reproduced were excellent in fine line reproduction performance, and free of spreading of the recording liquids in color boundaries. Furthermore, copy samples, each having a solid image in an entire printing possible area thereof, were made. There was observed almost no curling in the thus prepared copy samples.

COMPARATIVE EXAMPLE 1

The procedure for the formation of color images in Example 1 was repeated except that the image recording acceleration liquid No. 1 for use in Example 1 was not applied to any recording material. The result was that spreading of the recording liquids was observed in the color boundaries, and also in two color-superimposed line portions. Furthermore, when copy samples, each having a solid image in an entire printing possible area thereof, were made, curling was observed in the thus prepared copy samples.

COMPARATIVE EXAMPLE 2

The procedure for the formation of color images in Example 2 was repeated except that the image recording acceleration liquid No. 2 for use in Example 2 was not applied to any recording material. The result was that spreading of the recording liquids was observed in the color boundaries, and also in single color line portions and two color-superimposed line portions.

COMPARATIVE EXAMPLE 3

The procedure for the formation of color images in Example 3 was repeated except that the image recording acceleration liquid No. 3 for use in Example 3 was not applied to any recording material. The result was that spreading of the recording liquids was observed in the color boundaries, and also in two color-superimposed line portions.

(1) Evaluation of "Strike through" and Image Density

The color images formed on the commercially available copy papers and bond papers in Examples 1 to 3 and Comparative Examples 1 to 3 were evaluated with respect to the "strike through" and the image density of the obtained color images.

The results are shown in TABLE 1, in which Mark "○" denotes that the image density was more than 1 and the image was free of the "strike through"; mark "Δ" denotes that the image density was in the range of 0.8 to 1 and the "strike through" was slight in the image; and mark "x" denotes that the image density was less than 0.8 and the "strike through" was excessive in the image.

(2) Evaluation of Water Resistance of Image

Test samples of the color image bearing copy papers and bond papers prepared in Examples 1 to 3 and Comparative Examples 1 to 3 were immersed in water of 30° C. for one minute, and the image density (ID) before the water immersion thereof and that after the water immersion were measured by use of a Macbeth densitometer, and the water resistance of the image was determined in terms of the fading ratio by percentage in accordance with the following formula:

$$\text{Fading ratio (\%)} = \left[1 - \frac{\text{(ID after water immersion)}}{\text{(ID before water immersion)}}\right] \times 100$$

The results are also shown in TABLE 1 in which mark "○" denotes that the fading ratio was less than 5%; mark "Δ" denotes that the fading ratio was 5% or more, but less than 10%; and mark "x" denotes that the fading ratio was 30% or more.

TABLE 1

| Example No. | Recording Liquids | | "Strike through" & Image Density | Water Resistance |
|---|---|---|---|---|
| Example 1 | Yellow | No. 1 | ○ | ○ |
| | Magenta | No. 1 | ○ | ○ |
| | Cyan | No. 1 | ○ | ○ |
| | Black | No. 1 | ○ | ○ |
| Example 2 | Yellow | No. 2 | ○ | ○ |
| | Magenta | No. 2 | ○ | ○ |
| | Cyan | No. 2 | ○ | ○ |
| | Black | No. 2 | ○ | ○ |
| Example 3 | Yellow | No. 3 | ○ | ○ |
| | Magenta | No. 3 | ○ | ○ |
| | Cyan | No. 3 | ○ | ○ |
| | Black | No. 3 | ○ | ○ |
| Comparative Example 1 | Yellow | No. 1 | ○ | X |
| | Magenta | No. 1 | ○ | X |
| | Cyan | No. 1 | Δ | X |
| | Black | No. 1 | ○ | X |
| Comparative Example 2 | Yellow | No. 2 | X | X |
| | Magenta | No. 2 | Δ | X |
| | Cyan | No. 2 | ○ | X |
| | Black | No. 2 | Δ | Δ |
| Comparative Example 3 | Yellow | No. 3 | Δ | ○ |
| | Magenta | No. 3 | Δ | ○ |
| | Cyan | No. 3 | Δ | ○ |
| | Black | No. 3 | X | ○ |

The above results indicate that the images formed in Examples 1 to 3 of the present invention show high image density and excellent water resistance and are free of the "strike through", while the images formed in Comparative Examples 1 to 3 are poor in water resistance and the "strike through" was observed in the images.

As previously explained, according to the present invention, since the penetrability of the recording liquid into the recording material can be improved and the recording liquid deposited on the recording material can be speedily thickened, there can be obtained high quality color images which are excellent in the reproduction performance of fine lines, free of the ink spreading in color boundaries, and exhibit excellent water resistance.

In addition, the formation of color images can be carried out at high speed without the curling and cockling of the recording material. Furthermore, color images with high image density, free from the strike-through can be obtained.

Japanese Patent Application No. 09-256080 filed Sep. 4, 1997 is hereby incorporated by reference.

What is claimed is:

1. An image recording method for forming an image on a recording material, using a recording liquid which comprises a coloring agent and a solvent in which said coloring agent is dispersed or dissolved, comprising the steps of:

applying to said recording material a colorless or light colored image recording acceleration liquid capable of controlling a penetration performance of said recording liquid into said recording material and a fixing performance of said recording liquid onto said recording material, said image recording acceleration liquid comprising a surfactant and a viscosity-increasing compound capable of increasing the viscosity of said recording liquid, and depositing said recording liquid imagewise on said recording material by ejecting said recording liquid in the form of droplets onto said recording material.

2. The image recording method as claimed in claim 1, wherein said viscosity-increasing compound comprises an inorganic ion which can be liberated therefrom in said image recording acceleration liquid, and said recording liquid further comprises a viscosity-increasing assisting compound capable of increasing the viscosity of said recording liquid in combination with said inorganic ion liberated from said viscosity-increasing compound.

3. The image recording method as claimed in claim 2, wherein said viscosity-increasing assisting compound for use in said recording liquid comprises hydroxyl group.

4. The image recording method as claimed in claim 3, wherein said viscosity-increasing assisting compound is selected from the group consisting of polyvinyl alcohol, derivatives thereof, and polysaccharide.

5. The image recording method as claimed in claim 2, wherein said viscosity-increasing assisting compound for use in said recording liquid is in an amount of 0.1 to 5 wt. % of the total weight of said recording liquid.

6. The image recording method as claimed in claim 2, wherein said inorganic ion which can be liberated from said viscosity-increasing compound is boric acid ion.

7. The image recording method as claimed in claim 6, wherein said viscosity-increasing compound is selected from the group consisting of borax, ammonium borate and lithium borate.

8. The image recording method as claimed in claim 7, wherein said viscosity-increasing compound is in a range of 0.1 to 5 wt. % of the total weight of said image recording acceleration liquid.

9. The image recording method as claimed in claim 1, wherein said image recording acceleration liquid is applied in a deposition amount of 0.1 g/m² to 10 g/m² to said recording material.

10. The image recording method as claimed in claim 1, wherein said surfactant contained in said image recording acceleration liquid comprises at least one of surfactants represented by any of formulas (1) to (5):

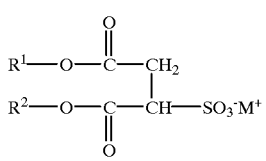
(1)

wherein $R^1$ and $R^2$ are each independently an alkyl group having at least 3 carbon atoms, which is optionally branched; and $M^+$ is a cation selected from the group consisting of an alkali metal cation, ammonium cation, an alkanolamine cation, a quaternary ammonium cation and a quaternary phosphonium cation,

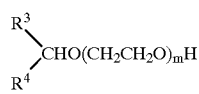
(2)

wherein $R^3$ and $R^4$ are each independently an alkyl group having 5 to 7 carbon atoms, and m is an integer of 5 to 20,

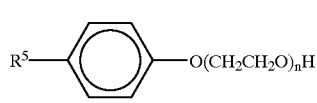
(3)

wherein $R^5$ is a carbon chain having 6 to 14 carbon atoms, which is optionally branched, and n is an integer of 5 to 20,

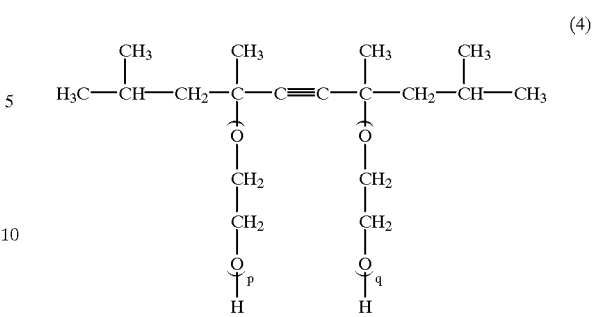
(4)

wherein p and q are each independently an integer of 0 to 20, and

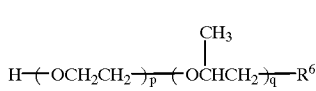
(5)

wherein $R^6$ is a carbon chain having 6 to 14 carbon atoms, which is optionally branched, and p and q are each independently an integer of 0 to 20.

11. The image recording method as claimed in claim 1, wherein said image recording acceleration liquid further comprises a monohydric alcohol.

12. An image recording apparatus for forming an image on a recording material, using a recording liquid which comprises a coloring agent and a solvent in which said coloring agent is dispersed or dissolved, comprising:
means for applying to said recording material a colorless or light colored image recording acceleration liquid capable of controlling a penetration performance of said recording liquid into said recording material and a fixing performance of said recording liquid onto said recording material, said image recording acceleration liquid comprising a surfactant and a viscosity-increasing compound capable of increasing the viscosity of said recording liquid, and
means for depositing said recording liquid imagewise on said recording material by ejecting said recording liquid in the form of droplets onto said recording material.

13. An image recording acceleration liquid which is applied to a recording material before a recording liquid comprising a coloring agent and a solvent capable of dispersing or dissolving said coloring agent is ejected in the form of droplets onto said recording material for image formation, said image recording acceleration liquid comprising:
(a) a surfactant,
(b) a viscosity-increasing compound capable of increasing the viscosity of said recording liquid, and
(c) a solvent capable of dispersing or dissolving said surfactant and said viscosity-increasing compound.

14. The image recording acceleration liquid as claimed in claim 13, wherein said viscosity-increasing compound comprises an inorganic ion which can be liberated therefrom in said image recording acceleration liquid.

15. The image recording acceleration liquid as claimed in claim 14, wherein said inorganic ion is boric acid ion.

16. The image recording acceleration liquid as claimed in claim 15, wherein said viscosity-increasing compound is selected from the group consisting of borax, ammonium borate and lithium borate.

17. The image recording acceleration liquid as claimed in claim 16, wherein said viscosity-increasing compound is in a range of 0.1 to 5 wt. % of the total weight of said image recording acceleration liquid.

18. The image recording acceleration liquid as claimed in claim 13, wherein said surfactant comprises at least one of surfactants represented by any of formulas (1) to (5):

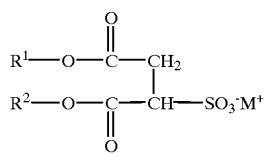
(1)

wherein $R^1$ and $R^2$ are each independently an alkyl group having at least 3 carbon atoms, which is optionally branched; and $M^+$ is a cation selected from the group consisting of an alkali metal cation, ammonium cation, an alkanolamine cation, a quaternary ammonium cation and a quaternary phosphonium cation,

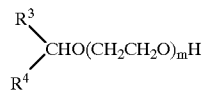
(2)

wherein $R^3$ and $R^4$ are each independently an alkyl group having 5 to 7 carbon atoms, and m is an integer of 5 to 20,

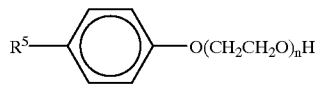
(3)

wherein $R^5$ is a carbon chain having 6 to 14 carbon atoms, which is optionally branched, and n is an integer of 5 to 20,

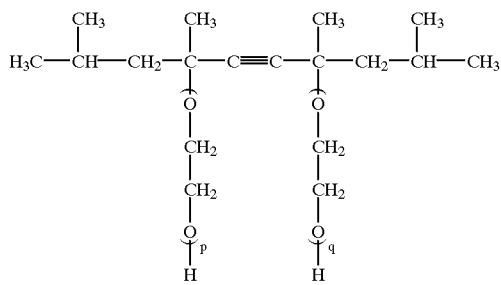
(4)

wherein p and q are each independently an integer of 0 to 20, and

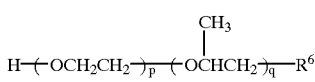
(5)

wherein $R^6$ is a carbon chain having 6 to 14 carbon atoms, which is optionally branched, and p and q are each independently an integer of 0 to 20.

19. The image recording acceleration liquid as claimed in claim 13, further comprising a monohydric alcohol.

20. A recording liquid for forming an image on a recording material in such a manner that an image recording acceleration liquid comprising a surfactant and a viscosity-increasing compound which is capable of increasing the viscosity of said recording liquid and from which compound an inorganic ion can be liberated in said image recording acceleration liquid is applied to said recording material, and said recording liquid is deposited imagewise on said recording material by ejecting said recording liquid in the form of droplets onto said recording material, said recording liquid comprising:
  (a) a coloring agent,
  (b) a viscosity-increasing assisting compound comprising hydroxyl group, capable of increasing the viscosity of said recording liquid in combination with said inorganic ion liberated from said viscosity-increasing compound, and
  (c) a solvent for dispersing or dissolving said coloring agent and said viscosity-increasing assisting compound.

21. The recording liquid as claimed in claim 20, wherein said viscosity-increasing assisting compound is selected from the group consisting of polyvinyl alcohol, derivatives thereof, and polysaccharide.

* * * * *

UNITED STATES PATENT AND TRADEMARK OFFICE
CERTIFICATE OF CORRECTION

PATENT NO. : 5,993,524

DATED : November 30, 1999

INVENTOR(S): Kiyofumi NAGAI, et al.

It is certified that an error appears in the above-identified patent and that said Letters Patent is hereby corrected as shown below:

Column 2, line 16 "met hod" should read --method--.

Signed and Sealed this

Ninth Day of January, 2001

Attest:

Q. TODD DICKINSON

*Attesting Officer*    *Commissioner of Patents and Trademarks*